3,169,120
COATING COMPOSITION OF VINYLIDENE
FLUORIDE POLYMERS
Nicholas J. Capron, Chalfont, and Alkis Christofas, Philadelphia, Pa., assignors to Pennsalt Chemicals Corporation, Philadelphia, Pa., a corporation of Pennsylvania
No Drawing. Filed Feb. 5, 1960, Ser. No. 6,862
5 Claims. (Cl. 260—29.6)

This invention is directed to dispersions of vinylidene fluoride polymers and to methods of preparing films or coatings from the said dispersions.

Free radical polymerization of vinylidene fluoride monomer produces a polymer averaging more than 2000 monomer units per chain. The highly regular structure of the resultant polymer molecule permits close packing of the polymer chains. Moreover, hydrogen bonding between chains is maximized since hydrogen and fluorine atoms are balanced producing cross-bonding of high energy.

This highly crystalline polymer of vinylidene fluoride exhibits outstanding physical properties such as strength, rigidity and resilience. Moreover, it can be oriented or stretched to produce an alignment of crystallites thereby developing super tensile strength properties desirable for film and filament uses. The polymer shows excellent chemical resistance to acids and bases and films of the polymer have proved very desirable as liners for storage tanks for such corrosive materials as nitric and hydrofluoric acids. It is insoluble in nearly all solvents at ambient temperatures. Polymers of vinylidene fluoride may be prepared by polymerization methods well known in the art such as are taught in United States Patent 2,435,537.

Vinylidene fluoride polymer may be used to form envelope coverings in the nature of protective materials, films and coatings for adherence to mechanical equipment such as fans, blowers, tanks, agitators, etc. where a high degree of resistance to chemical attack or to solvents is desired. In most of these applications it is undesirable to cast films or form coatings from a melt because of the difficulty of handling molten polymers of vinylidene fluoride at temperatures of about 200° C. where melt viscosities are 300,000 to 1,000,000 poise.

In order to overcome this difficulty we have sought alternate methods of forming such films and coatings. One such form of utilizing vinylidene fluoride polymer has been the preparation of solutions of the polymer with one or more pseudo solvents having a solvating effect on the polymer at ambient temperature. These new pseudo solutions of vinylidene fluoride polymer are described in a copending application entitled "Chemical Compositions," S.N. 6,866, filed February 5, 1960. A limitation in the use of solutions of the vinylidene fluoride polymer is that only a limited amount of material can be put into solution at ambient temperatures. This necessarily limits the thickness of the film which can be produced in one application.

We have now discovered that vinylidene fluoride polymers can be dispersed in high temperature organic solvents in the presence or absence of water, which dispersions can thereafter be used to make films and coatings. While our new dispersions are directed primarily to the vinylidene fluoride homopolymer, they are also applicable to vinylidene fluoride copolymers containing at least 95 mol percent of the vinylidene fluoride. Suitable comonomers are the halogenated ethylenes such as symmetrical dichlorodifluoroethylene, 1,1,2-trifluoro-2-chloroethylene, tetrafluoroethylene, vinyl fluoride, vinyl chloride and others. When at least 95 mol percent of vinylidene fluoride is present, the important chemical resistance and mechanical characteristics of copolymers of vinylidene fluoride remain essentially identical to the homopolymer. Whenever the term vinylidene fluoride polymer is used in this application, we are referring to the homopolymer or copolymer as defined above.

We have found that the ability of an organic liquid to lower the observed crystalline melting point, $T_m$, of vinylidene fluoride polymers is a semi-quantitative measure of its solvating effect upon that polymer. By $T_m$ is meant the polymer concept of first order transition point or crystalline melting point which we have found to be 175–180° C. for polyvinylidene fluoride in the absence of a solvent. The observed solvent lowering of $T_m$ for vinylidene fluoride polymer can be measured by viewing a polymer film specimen in the presence of said solvent between crossed polaroid sheets as the temperature is raised. Birefringence of the polymer shows light transmission in a dark field which disappears when solvation of the polymer is sufficient to destroy the polymer crystallites. Thusly, various organic liquids impart specific $T_m$ values for vinylidene fluoride polymers depending upon their ability to solvate the polymer. Conversely, little or no solvent action occurs upon vinylidene fluoride polymers below the observed $T_m$ values for a given solvent.

Those organic compounds which lower the observed $T_m$ of the polymer below 90° C. are classified as pseudo solvents for the polymer and are useful for preparing apparent solutions of the polymer at ambient temperatures. However, the organic materials which impart a $T_m$ to the polymer in the range of 90 to 160° C. are designated as high temperature organic solvents, i.e., they have no effect on the polymer below about 90° C. This is evidenced by microscopic examination of these suspensions after six months storage and by the further fact that little or no change was apparent in viscosity.

These values for $T_m$ lowering are important in preparing our new aqueous and non-aqueous dispersions. For example, low viscosity fluid dispersions which contain high concentrations of vinylidene fluoride polymers (i.e. 50% solids) can now be prepared from high temperature organic solvents. These dispersions enable us to produce thick coatings in one application.

In forming dispersions of vinylidene fluoride polymers it is desirable that the polymer be used as it comes directly from the polymerization reactor without the necessity of intermediate processing, thus eliminating filtering, washing and drying of the polymer. Our high temperature organic solvents enable us to produce satisfactory films or coatings in the presence of water. The water does not interfere with the film formation, primarily, because solvating action by the high temperature organic solvents does not occur until after the water has been removed. This eliminates blush or non-transparent appearance. Thus, these high temperature organic solvents will have a boiling point in excess of 100° C.

The general technique used for preparing films and coatings from other fluorinated polymers such as polychlorotrifluoroethylene or polytetrafluoroethylene consists of preparing a dispersion of polymer in an inert liquid which is then sprayed on a substrate to which a suitable primer has been applied. The inert liquid is evaporated from the article to be coated leaving a fine powder on the surface. The article is then placed in an oven and sintered at high temperatures to coalesce these fine particles and obtain a film. In this method of application pin holes usually occur in the film, and it is necessary to apply five or more coatings in order to obtain a pinhole-free surface suitable for corrosion control. By using the high temperature organic solvents for vinylidene fluoride polymers which impart a $T_m$ within the range of 90–160° C. and which solvents have boiling points in the range of 100° C. to 300° C., we are able to prepare transparent films and coatings of vinylidene fluoride polymer which are pin-hole-free in one single coating or film forming operation.

High temperature organic solvents which are particularly useful in forming dispersions of vinylidene fluoride polymers are tetraethylurea, diethyladipate, diethylsuccinate, dimethylphthalate, diethylphthalate, diethyloxalate, triethylphosphate, diethylformamide and dimethylsuccinate. These solvents all impart an abserold $T_m$ within the range of 90–160° C. for the vinylidene fluoride polymers and have a boiling point in excess of 100° C., the temperature at which water is removed if present. Generally, the boiling points of these solvents will range from 160–300° C. A solvent having a boiling point in excess of 300°C. would be undesirable because of the extremely slow rate of evaporation of such a solvent from the films which are being prepared. The abserold $T_m$ values and boiling points of solvents useful in our compositions and processes are indicated in the table below. The boiling points are given for 760 mm. mercury pressure except where otherwise indicated.

TABLE 1

| | Solvent Melting Temperatures, ° C., $T_m$ | Boiling Point, ° C. |
| --- | --- | --- |
| Diethylformamide | 92 | 177-8 |
| Triethylphosphate | 97 | 215-6 |
| Dimethylsuccinate | 120 | 195 |
| Diethyloxalate | 130 | 185.4 |
| Diethylsuccinate | 130 | 217.8 |
| Tetraethylurea | 135 | 212 |
| Dimethylphthalate | 135 | 260/734 mm. |
| Diethyladipate | 138 | 133.8/15 mm. |
| Diethylphthalate | 145 | 289.5 |

In the above group of solvents which are useful practicing our invention four of the solvents are exceptional in their utility and are to be preferred. Triethylphosphate, diethylsuccinate, tetraethylurea and dimethylsuccinate have exceptional properties in regard to the ease with which they can be evaporated from films, to their stability during the film forming operation, and to their viscosity stability while dispersed with the vinylidene fluoride polymer during storage.

For example, triethylphosphate, dimethylsuccinate, diethylsuccinate and tetraethylurea will completely evaporate at 180° C. from a vinylidene fluoride polymer dispersion and form a film of approximately 5 mils thickness in 35 minutes or less whereas the dimethylphthalate, diethyladipate and diethylphthalate required evaporation times in the range of 70 to 80 minutes under identical conditions. Generally, rapid evaporation of the solvent is desired although there are occasions when a slow drying solvent may be preferred.

In general, all of our high temperature organic solvents have shown good stability toward the high temperatures encountered in the curing process. Only diethylformamide and diethyloxalate have shown an occasional tendency to discolor the film, probably due to decomposition of the solvent.

It is important that these dispersions maintain a fairly constant viscosity during extended storage periods as would be encountered during shelf storage for marketing purposes. Good stability in this respect has been observed for all of our solvents listed in Table 1 with an occasional increase in viscosity of diethyloxalate dispersions.

*Aqueous dispersions*

In preparing dispersions using the aqueous polymerization product the amount of high temperature organic solvent which is added to the aqueous polymer dispersion will generally be within the range of ½ of the amount of water present to about five times the amount of water present in the polymerization product. These figures are given for an aqueous system issuing from a polymerization reactor containing approximately 30% by weight vinylidene fluoride solids. However, we can concentrate the aqueous dispersion issuing from the polymerization reactor by centrifuging or by other means and a higher solids content mixture, for example, 40 to 60% solids, can be obtained. When these higher solids content mixtures are used, we require that the amount of high temperature organic solvent be within the upper limits of the range given above.

The high temperature organic solvent for the vinylidene fluoride polymer can be added to the aqueous mixture after it leaves the polymerization reactor, or it can be added to the aqueous mixture after it has been concentrated. The solvent is added to the aqueous vinylidene fluoride polymer under conditions of agitation. It will be apparent that in order to form a stable dispersion in aqueous systems these solvents will be miscible with water.

A high speed blender, paint mill or colloid mill are suitable machinery for making the suspension of the vinylidene fluoride polymer in the water-organic solvent system. After dispersion of the liquid mixture is obtained, the dispersion is deaerated by applying a vacuum or allowing it to stand quietly and thereafter it is ready for application by spraying or casting. It will be appreciated by those skilled in the art that only one solvent will be needed for preparing the aqueous dispersions described above, and it is preferable that only one be used. However, if special dispersions are desired requiring the use of more than one solvent, then, of course, more than one can be used. It is only necessary that the amount of combined solvents used be no more than approximately five times the amount of water present, the same quantity required when only one solvent is present.

An important requirement in preparing the aqueous dispersions of our invention is that particle size of the polymer be not in excess of 20 microns. Generally, the polymer will have a particle size in the range of 0.05 to 5.0 microns. We have found that particles in excess of 20 microns will settle unevenly on the surfaces and leave a film which will be rough in appearance and also containing small pin holes. The pin holes will result because of the uneven curing of the polymer due to the variation in thickness of the layers of polymeric material which are subjected to the same heat treatment. A thick section of the polymer caused by a large particle will not be entirely cured, and the residual solvent contained therein will cause undesirable blushing and softness.

The viscosity of the aqueous dispersions will vary from 50 centipoises to 300 centipoises. One of the limitations of the amount of solvent which can be added to the systems is that the viscosity will be undesirably reduced. If the viscosity is below 50 centipoises at the temperature of application, the viscosity can be readily increased by using a higher solids content dispersion.

It is sometimes desirable in preparing these aqueous dispersions that a surfactant or wetting agent be added in order to promote the dispersion of the solids in the aqueous systems and to facilitate leveling of the sprayed polymer dispersion when placed upon a surface for film-coating purposes. Suitable surfactants are reaction products of dodecyl phenol and ethylene oxide, nonyl phenol and ethylene oxide, tertiary dodecyl mercaptans and ethylene oxide.

The aqueous dispersions of our invention may be applied by casting or by spray application. Because of the dilution effect of the water obtained in an aqueous dispersion system, this form of our invention is particularly useful in preparing film sheets of a limited thickness, such as from 1 to 3 mils in one application. While such thin sheets of polymers are not normally desired for corrosion prevention or solvent resistance, they are particularly desirable in preparing ultra clear films for wrapping materials, particularly for outdoor use.

In applying aqueous dispersions of the vinylidene fluoride polymer to a metal plate for preparing film sheets the dispersion is flowed on, and the excess allowed to drain off. The plate then progresses into a drying chamber where the water portion of the system is removed by raising the temperature of the film and plate to about 85 to 95° C. This temperature range is held for about 15 minutes after which the film and plate progress into a second drying chamber where the temperature of the film is raised to 100–160° C. The final cure is done at a temperature of about 180° C.

Low temperature drying is used at first to remove the water from the film at a temperature at which water will not boil. This requires that a temperature not exceeding about 95° C. be used in the first drying chamber.

After the water has been removed from the film, the temperature is again raised to evaporate the high temperature solvent. This will generally be within the range of about 100–160° C. As high a temperature as possible is desired without approaching the boiling point of the solvent being used since high temperatures promote the more rapid removal of the solvent and a quicker coalescing of the polymer particles into a continuous film. The drying temperature at the water removal stage and at the solvent removal stage must not exceed the respective boiling points of the water or of the solvent until at least 90% of the water or the solvent have been removed. Thereafter, the drying temperature can be raised above that of the boiling point of the water or of the solvent as may be desired in order to speed up the evaporation operations.

The final drying is conducted at a temperature of 180° C. which temperature is the first order transition temperature for the polyvinylidene fluoride. This temperature is used in order to coalesce the polymer and remove the high temperature solvent. Temperatures considerably higher than 180° C. should not be used for long periods of time because such temperatures, exceeding the first order transition temperature, can cause changes in polymer properties. However temperatures as high as 300° C. can be tolerated for short periods of time.

It is also possible to speed up the drying operation by increasing the rate of water removal from the film by including a small percentage of an organic azeotroping agent in the system. Water azeotroping agents in the amount of 2 to 10% of the total dispersion weight may be used. Examples of such agents are butyl and amyl alcohol.

The films and coatings prepared from these aqueous dispersions have exceptional clarity and a high tensile strength of approximately 5000 p.s.i. at room temperature. The film sheets are pin-hole free and bubble free. Generally, the films are in the range of 1.5 to 5 mils thickness. Our new aqueous dispersions will be better understood after a consideration of the following examples. All parts given are percent by weight unless otherwise stated.

EXAMPLE 1

One hundred parts by weight of vinylidene fluoride polymer aqueous dispersion containing 30% solids was placed in a Waring blender. To this was added 60 parts by weight of tetraethylurea and 20 parts of triethylphosphate. After the mixture had been agitated in the blender for ten minutes, it was deaerated by applying a vacuum. The viscosity at room temperature was 80 centipoises.

A portion of the above dispersion was sprayed on a chrome plate and the plate inserted in an oven for curing. The following curing cycle gave optimum results: 15 minutes at 85°–95° C. followed by a second exposure at 140° F. for 5 minutes and finally a fusion cure at 180° C. for 5 minutes. The plate was quenched in water at room temperature and the film stripped from it. The sheet was clear and pin-hole free and had a tensile strength of 5000 p.s.i. at room temperature as measured by an Instron tensile tester.

EXAMPLE 2

Vinylidene fluoride homopolymer having a particle size of 0.05 to 5 microns as it was received from the polymerization reactor contained approximately 30% solids in water. One hundred parts of this suspension of vinylidene fluoride polymer was placed in a high speed mixing apparatus along with 70 parts by weight of tetraethylurea. The mixture was blended for about 10 minutes until a stable suspension was obtained. The suspension was then deaerated for 30 minutes by standing.

The suspension was applied to a chrome plate by a high pressure sprayer after which the coated plate was placed in a drying chamber and held at 85 to 95° C. for 15 minutes. The plate with attached film was then placed in a second drying chamber and heated at 140° C. for 15 minutes. The curing of the film was completed by heating at 180° C. for 5 minutes. The plate with attached film was then quenched in a water bath held at room temperature after which the film was stripped from the plate. The film had a thickness of 1 mil and a tensile strength of 4120 p.s.i. at room temperature. The film had exceptional clarity and was free of bubbles.

EXAMPLE 3

One hundred parts of an aqueous dispersion of vinylidene fluoride homopolymer containing 30% polymer solids and of particle size 1 to 20 microns was combined in a high speed blending apparatus with 140 parts of triethylphosphate. After thorough blending, the suspension was deaerated by applying a vacuum.

A single spraying application of a portion of this suspension was made on a steel panel which was previously sand blasted and treated with a zinc dihydrogen phosphate solution. The polymer coated steel panel was dried first at 95° C. for 20 minutes and then at 125° C. for 10 minutes. The curing cycle was completed by a fusion treatment at 180° C. for 5 minutes. The panel was withdrawn from the oven and cooled to room temperature slowly. Before and after measurement of the panel showed a film thickness of 1 mil. The adhesion of the film was good, and it was not ruptured by a reverse impact test of 28 inch pounds.

EXAMPLE 4

An aqueous dispersion of vinylidene fluoride homopolymer was analyzed at 30% solids as it was removed from the polymerization reactor. This dispersion having a particle size 1 to 5 microns was concentrated by centrifuging to 60% polymer solids.

One hundred parts by weight of this polymer concentrate was blended with 40 parts by weight of tetraethylurea and 20 parts by weight of triethylphosphate in a high speed blender until a stable suspension was obtained. This suspension was then allowed to deaerate by standing one hour.

A portion of the above suspension was sprayed on a chrome plate and the plate inserted in an oven for drying. The following drying cycle developed the best cure: 10 minutes at 95° C., 15 minutes at 150° C. and finally a fusion treatment at 180° C. for 5 minutes. The plate with attached film was then quickly quenched in a 25° C. water bath and the film stripped from the plate. It had a thickness of 2 mils and tensile strength of 4200 p.s.i. at room temperature as measured by an Instron tensile tester. The film was clear and bubble free.

EXAMPLE 5

One hundred parts by weight of an aqueous dispersion of vinylidene fluoride homopolymer having a particle size of 1 to 5 microns was placed in a high speed blender. Sixty parts by weight of tetraethylurea and 50 parts by weight of n-amyl alcohol was combined with the aqueous dispersion of polymer and blended until a stable suspension was obtained. The suspension was then allowed to stand an hour to deacrate.

A single spraying application of the suspension was made to a chrome plate. The plate was then placed in an oven and heated at 95° C. for 25 minutes followed by a 10 minute cure at 150° C. A fusion cure at 180° C. for 5 minutes completed the drying cycle.

The film covered plate was quenched in water held at 25° C. The film was stripped from the plate and had a thickness of 0.8 of a mil. It was exceptionally clear and bubble free.

EXAMPLE 6

One hundred parts by weight of an aqueous dispersion containing 30% vinylidene fluoride homopolymer solids having a particle size of 0.5 to 5 microns was placed in a high speed blender. Seventy parts by weight of diethylsuccinate and 0.5 part by weight of a surfactant of the type produced by reaction of nonyl phenol and ethylene oxide were added to the above aqueous suspension and the mixture thoroughly agitated. The stable suspension thus formed was allowed to deaerate by standing quiescent for an hour.

A steel panel which had been sand blasted and treated with a phosphating solution was sprayed with a portion of the above suspension. The panel was evenly wetted by the polymeric dispersion. After drying at 95° C. for 15 minutes followed by a 15 minute dry at 135° C. and a fusion cure at 180° C. for 5 minutes, the panel with attached film was cooled slowly to room temperature. The film had a 1 mil thickness and was extremely clear. Adhesion to the metal panel was good—no rupture occurred on a reverse impact test of 28 inch pounds.

EXAMPLE 7

One hundred parts by weight of a dispersion of a copolymer of vinylidene fluoride and 1,1,2 - trifluoro - 2-chloroethylene containing 2.9 mol percent of the latter halogenated ethylene was placed in a high speed blending apparatus. The copolymer suspension contained 30% solids and had a particle size range of 0.5 to 5 microns. To 100 parts by weight of this aqueous suspension was added 60 parts of tetraethylurea and the mixture blended until a stable suspension took place. The resulting dispersion was allowed to deaerate by standing for 30 minutes.

A one spray application of the above suspension was made to a chome plate. The plate was dried at 95° C. for 30 minutes and 150° C. for 15 minutes. After a fusion treatment at 180° C. for 5 minutes, it was quenched in water at 25° C. The film after stripping from the plate was clear and bubble free and had a tensile strength of 3500 p.s.i. at room temperature.

EXAMPLE 8

One hundred parts by weight of a dispersion containing 30 parts by weight of a copolymer of vinylidene fluoride and symmetrical difluorodichloroethylene containing about 5 mol percent of the latter with 70 parts by weight of water was placed in a high speed blender. To this aqueous mixture was added 30 parts by weight of tetraethylurea and 30 parts by weight of triethylphosphate and 1 part by weight tridecylbisdimethylamidophospate. The material was mixed in the high speed blender until a stable suspension was obtained. The suspension was deaerated by allowing to stand quiescently for 1 hour.

A portion of this suspension was sprayed on a chrome plate with a high pressure spray gun. Only one application of the suspension was made to the plate. The plate with attached suspension was then placed in a drying oven and heated at 95° C. for 15 minutes. The plate with attached film was then placed in a second drying chamber and heated at 150° C. for 15 minutes. Final cure of the copolymer film occurred at 180° C. for 5 minutes. Following the evaporation of the solvents the plate with attached film was placed in a water quenching bath held at room temperature. The cooled film was readily stripped from the plate. The film was clear, free of bubbles and had a tensile strength of 3600 pounds per square inch at room temperature.

*Non-aqueous dispersions*

In another form of our invention we have prepared diversions of vinyldene fluoride homopolymers and copolymers, as previously defined, in the absence of an aqueous phase. These polymeric dispersions are also formulated with the same high temperature organic solvents used to formulate the aqueous dispersions. They can be formulated from 5 to 60% solids and are of a sprayable viscosity at room temperature. Single spray applications of this type of dispersion will permit the formation of films and coatings of 5 to 10 mils thickness.

In preparing these dispersions the aqueous polymer mixture as obtained from the polymerization reactor is treated by filtering or centrifuging to separate the water from the polymer. The polymer cake is washed with water several times and finally with methanol in order to remove as much water as possible prior to drying. The polymer is dried at about 110° C. in conventional drying equipment, and it is then ready for formulation in these organic dispersions. For most satisfactory results a particle size of 0.05 to 5 microns has proved best, but a particle size as high as 20 microns is usable.

These dispersions are prepared by placing a high temperature organic solvent, as disclosed in Table 1 above, in a blending apparatus and adding the required amount of polymer powder. Proper mixing of solvent and polymer can be accomplished in a paint mill, colloid mill or a high speed blending apparatus. These dispersions have a viscosity at room temperature sufficiently low to permit spraying of a 40% to 60% solids system.

In general, the dispersion viscosity can be regulated by varying the solids content of the dispersion. If desired, other organic solvents which have no solvating action on the vinylidene fluoride polymer may be added to control dispersion viscosity or for other purposes. Organic solvents which may be added to control viscosity are xylene, acetone, dioxane, methylethylketone, methylisobutylketone, tetrahydrofuran, methylamylketone, etc. The amount of diluent added will be determined by the viscosity required for the particular application. In general, the amount of diluent may vary from 5 to 50% of the total weight.

After the high temperature organic solvent and polymer powder have been mixed and a stable suspension is formed, the mixture is deaerated and is then ready for application by spraying, dip coating, doctor's blade, etc. to a substrate that may be metal, cloth, plastic or wood. Whatever the method of application, the coated material is inserted in an oven and the drying cycle begun.

The curing or solvent removal conditions generally follow those for the films containing water in suspension except that with these non-aqueous dispersions there will not be an initial water removal step. Generally, an initial cure at a temperature produced by the lowering of the $T_m$ of the polymer due to solvent destruction of the crystallites (i.e. at the $T_m$ temperature of the polymer for that solvent) and a final fusion cure at the $T_m$ of the polymer itself, i.e. at 175–180° C., produces film or sheet with the best properties. The film and its substrate can then be quenched in water or slowly cooled in air depending on the end use of the coated article thus prepared. As indicated previously, the prime curing temperature will vary for each solvent because each has its own temperature at which it can solvate the polymer or copolymer.

During the drying operation the solvent or solvents may be evaporated initially at a temperature of 140 to 180° C. until about 90% of the solvents are removed. Final cure takes place at 180° C. Alternatively, the entire curing may take place at 180° C. A typical drying cycle of a dispersion of this type containing 40 parts by weight of vinylidene fluoride polymer in 60 parts by weight of tetraethylurea would be to dry it for 20 minutes at a temperature of 140° C. and then give it a final fusion treatment at 180° C. for 5 minutes.

Because we are able to vary widely the solids content of these dispersions, it is possible to obtain any thickness of film or coating up to 10 mils, in one application. The tensile strength of such unoriented film will run up to 5000 p.s.i. Such coatings will find many uses in corrosion control, radiation and steam sterilization, packaging and related uses.

EXAMPLE 9

Forty parts by weight of dry polyvinylidene fluoride having a plasticity of 2300 and a particle size of 1 to 5 microns was blended for ten minutes in a Waring blender with 60 parts by weight of dietylhoxalate. The dispersion was then deaerated by application of a vacuum and the viscosity of this system at 25° C. was 330 centipoises.

A metal panel which had been previously sand blasted and treated with zinc dihydrogen phosphate solution was given a single spray application of the above dispersion. The coated panel was placed in an oven at 150° C. for 20 minutes and this was followed by a fusion treatment at 180° C. for 10 minutes. The panel was then quenched in a water bath held at room temperature. The film produced on the panel had a thickness of approximately 5 mils and could not be ruptured by a reverse impact test of 28 inch pounds.

Plasticity as used in this application is an indication of molecule size. The measurement is obtained by taking a 0.5 gram pile of polymer powder and compressing it in a press at 2500 p.s.i.g. at 225° C. for exactly one minute. The area of the resulting plaque in sq. mm. is called the plasticity. The desired vinylidene fluoride polymers have a plasticity within the range of 1500 to 3000 and an average plasticity of about 2300.

EXAMPLE 10

Sixty parts by weight of vinylidene fluoride homopolymer was blended with 40 parts by weight of tetraethylurea. The vinylidene fluoride homopolymer had a particle size range of 0.05 to 5 microns with the majority in the 2 micron range and had a plasticity of 2300. The viscosity of the blended material at 25° C. was 300 centipoises.

A portion of this suspension was placed on a chrome plate and drawn down with a doctor knife. The plate with attached film was placed in a first drying oven and held at 140° C. for 20 minutes and then heated to 180° C. for a ten minute period. Following the heat treating the film was rapidly quenched in a water bath held at room temperature and thereafter the film was stripped from the plate. The film sheet was slightly hazy but free of any bubbles and had a thickness of 10 mils. The tensile strength was 4500 p.s.i. at room temperature as tested by an Instron tensile tester.

EXAMPLE 11

Forty parts by weight of polyvinylidene fluoride having a particle size of 1 to 5 microns and a plasticity of 2300 was placed in a Waring blender with 20 parts by weight of diethylformamide, 20 parts by weight of triethylphosphate and 20 parts by weight of xylene. Following blending the dispersion was deaerated by allowing to stand for approximately 15 minutes. The viscosity of this mixture was 350 centipoises at 25° C.

Part of this dispersion was cast on a chrome plate and drawn down with a doctor knife. The plate with attached film was then placed in a first drying chamber and held at 160° C. for 15 minutes and then placed in a second drying chamber and held at 180° C. for 10 minutes. The plate with attached film was then quenched in a water bath held at room temperature and the film was stripped from the plate. The film sheet averaged about 5 mils in thickness and had a tensile strength of 4100 pounds per square inch. The sheet was clear and free of bubbles.

EXAMPLE 12

Forty parts by weight of vinylidene fluoride homopolymer having a particle size within the range of 1 to 5 microns and a plasticity of 2300 were blended with 30 parts by weight of diethylsuccinate and 30 parts of xylene. After thorough agitation of the mixture, it was removed from the blender and allowed to deaerate by standing at room temperature.

An electroplating rack was dipped into the suspension mixture and the excess allowed to drain. The dip-coated rack was then placed in an oven and heated at a temperature of 150° C. for 20 minutes followed by a second heating at a temperature of 195° C. for 5 minutes. A second dip-coat was applied following the same procedure as described above. The two coatings resulted in a film thickness of about 5 mils. The electroplating rack showed no chemical attack after one month's use in an acid copper plating bath.

A second portion of the suspension was applied to a canvas cloth to impregnate it. After impregnation the cloth was cured at 140° C. for 15 minutes and then the coating was pressed into the cloth by application of pressure from a hydraulic press at a 1000 p.s.i. and 180° C. for two minutes. A continuous film of vinylidene fluoride polymer was deposited on the cloth. Exposure of the impregnated portion of the cloth to dilute hydrochloric acid showed no discoloration or weakening of the fibers by chemical attack.

EXAMPLE 13

Two hundred parts by weight of vinylidene fluoride copolymer containing 2.9 mol percent of 1,1,2-trifluoro-2-chloroethylene having a plasticity of 2828 and particle size 1 to 5 microns was placed in a high speed blender. Four hundred parts by weight of tetraethylurea and 200 parts by weight of xylene was added and the mixture agitated for ten minutes. The suspension thus formed was allowed to deaerate by standing 15 minutes. The viscosity of this dispersion was 350 centipoises at 25° C.

A steel panel which had previously been sand blasted and phosphate treated was sprayed with a single application of this dispersion. The panel was placed in an oven and cured first at 140° C. for 15 minutes and then fused at 180° C. for 10 minutes. It was removed from the oven and allowed to cool to room temperature slowly. A clear pin hole free film of approximately 4 mils covered the panel, and it was not ruptured by a reverse impact test of 28 inch pounds.

EXAMPLE 14

Two hundred parts by weight of a copolymer of vinylidene fluoride and symmetrical dichlorodifluoroethylene containing about 5 mol percent of the latter was dispersed in 600 parts by weight of diethyloxalate by a high speed blending operation. This material had a viscosity at 25° C. of approximately 600 centipoises.

A portion of the copolymer suspension was placed on a chrome plate and drawn down with a doctor knife. The plate with attached coating was first heated at a temperature of 140° C. for 15 minutes and then placed in a second drying chamber and heated at 180° C. for 10 minutes. Following the two drying operations the plate with attached film was water quenched in a bath held at room temperature. After water quenching, the film was stripped off and observation showed that it was quite clear. The sheet of copolymer was approximately 4 mils in thickness and had a tensile strength of 3800 p.s.i. as determined by an Instron tensile tester.

EXAMPLE 15

Two hundred parts of polyvinylidene fluoride having a particle size of 0.05 to 5 microns was placed in a high speed blender. One hundred fifty parts of dimethylsuccinate and one hundred parts of diisobutylketone was added, and the mixture agitated for ten minutes. The suspension was allowed to stand for one-half hour. The viscosity was 600 centipoises at room temperature.

A portion of the suspension was drawn down on an aluminum plate with a doctor knife and then heated in an oven at 150° C. for ten minutes and finally at 180° C. for five minutes. The film after stripping from the plate was clear and free of pin holes.

EXAMPLE 16

Forty parts by weight of polyvinylidene fluoride was mixed with thirty parts by weight of diethyladipate and thirty parts by weight of xylene in a high speed blender. After deaeration the viscosity was 1200 centipoises at room temperature.

A portion of the suspension was cast on a polished plate and heated at 180° C. for thirty minutes. The film was stripped from the plate and was slightly yellow but free of bubbles.

The viscosity of the suspension after seven days storage at room temperature was 1300 centipoises.

While the above examples have disclosed sequential operation, it will be apparent to those skilled in the art that they are adaptable to continuous processes.

We claim:

1. Polymeric dispersions comprising vinylidene fluoride polymers selected from the group consisting of homopolymers and copolymers containing 95 mole percent or more of vinylidene fluoride and 5 mole percent or less of a halogenated ethylene having a particle size of 0.05 to 20 microns dispersed in an aqueous composition containing at least one water-miscible solvent selected from the group consisting of triethylphosphate, dimethyl-succinate, diethylsuccinate and tetraethylurea.

2. Polymeric dispersions of claim 1 in which the water-miscible solvent is triethylphosphate.

3. Polymeric dispersions of claim 1 in which the water-miscible solvent is dimethylsuccinate.

4. Polymeric dispersions of claim 1 in which the water-miscible solvent is diethylsuccinate.

5. Polymeric dispersions of claim 1 in which the water-miscible solvent is tetraethylurea.

References Cited in the file of this patent

UNITED STATES PATENTS

| | | |
|---|---|---|
| 2,435,537 | Ford et al. | Feb. 3, 1948 |
| 2,468,054 | Ford | Apr. 26, 1949 |
| 2,484,483 | Berry | Oct. 11, 1949 |
| 2,810,702 | Bechtold et al. | Oct. 22, 1957 |